Nov. 24, 1942.  G. STUHLFAUTH ET AL  2,302,813
CLAMPING DEVICE
Filed Nov. 10, 1939  2 Sheets-Sheet 1

INVENTORS
G. STUHLFAUTH
K. A. WESTON
BY Emery Robinson
ATTORNEY

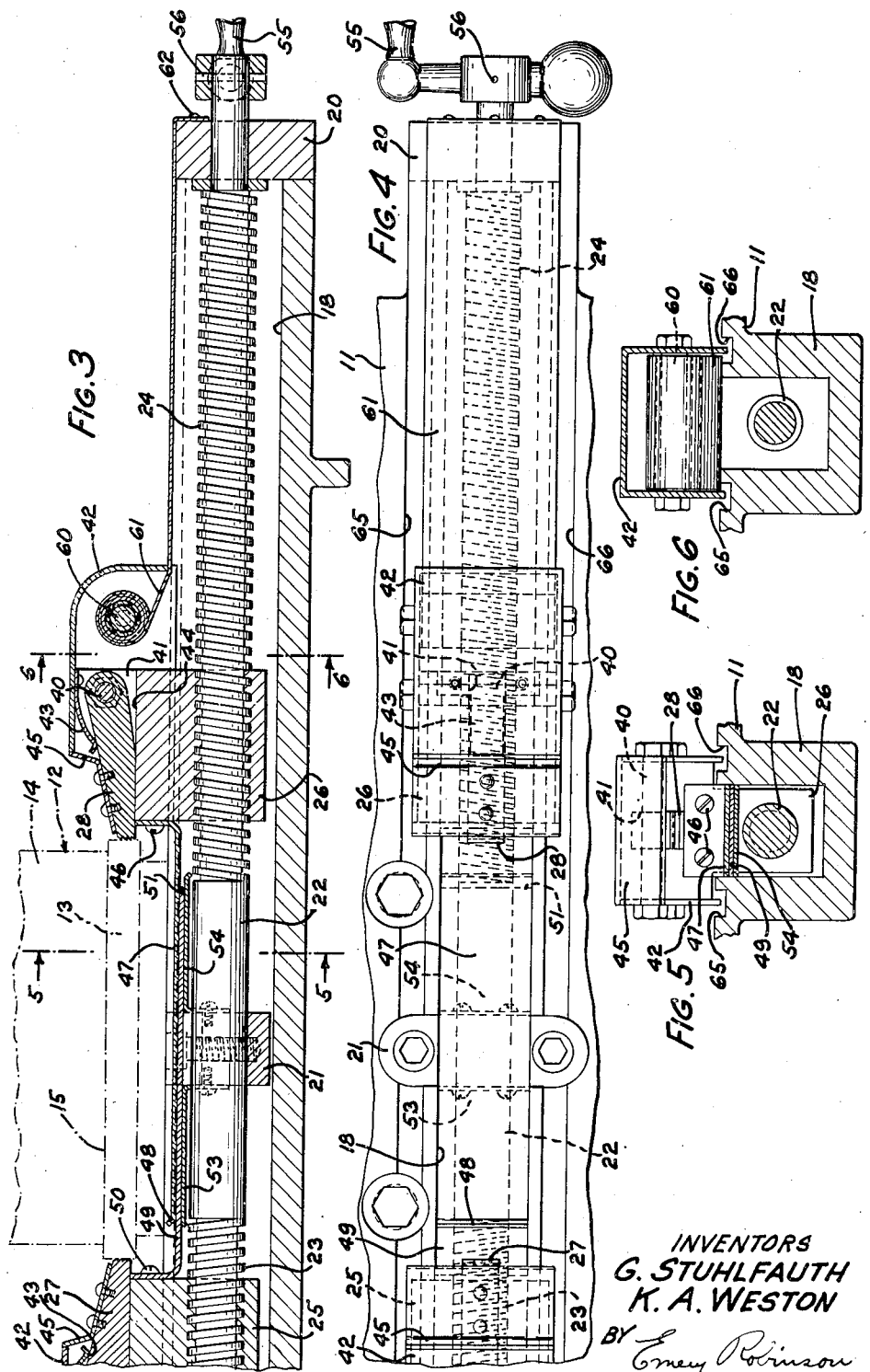

Patented Nov. 24, 1942

2,302,813

UNITED STATES PATENT OFFICE 2,302,813

CLAMPING DEVICE

George Stuhlfauth and Keith A. Weston, Chicago, Ill., assignors to Western Electric Company, Incorporated, New York, N. Y., a corporation of New York Application November 10, 1939, Serial No. 303,776

1 Claim. (Cl. 113—99)

This invention relates to clamping devices for holding parts during the welding thereof and more particularly to an adjustable clamping device provided with closure means for protecting the mechanism thereof from weld splatter.

It is an object of the present invention to provide a simple and durable apparatus for holding articles to be welded.

In accordance with one embodiment of the invention, two pairs of oppositely disposed clamp supporting members having clamps thereon are slidably positioned upon a turn table and are oppositely threaded to engage an actuating screw having two sets of threads for simultaneously moving the clamps of a pair of clamps toward each other. In order to prevent weld splatter from damaging the threads of the actuating screws, the portion of the screws which may be exposed between the clamps of a pair of clamps are covered by superposed slidable plates fixed to the clamp supporting members so that the plates will always cover any portion of the screw thread which may be exposed between the clamps. The portion of the screw threads which may be exposed outside of the clamps is protected from weld splatter by a flexible metal screen fixed to the outer bearing of the screw and mounted to roll up in a small housing which covers a portion of the clamp and which is mounted on the clamp supporting member in which the clamp is pivotally mounted.

A better understanding of the invention will be had by reference to the accompanying drawings, wherein Fig. 1 is a side elevational view of a supporting framework upon which a turn table is rotatable in a plane at an angle to the horizontal;

Fig. 3 is a fragmentary sectional view taken along the line 3—3 of Fig. 2 in the direction of the arrows;

Fig. 4 is an enlarged fragmentary sectional view in plan of the apparatus shown in Fig. 3; and Figs. 5 and 6 are transverse sectional views taken along the lines 5—5 and 6—6 of Fig. 3 in the direction of the arrows.

Figure 1:
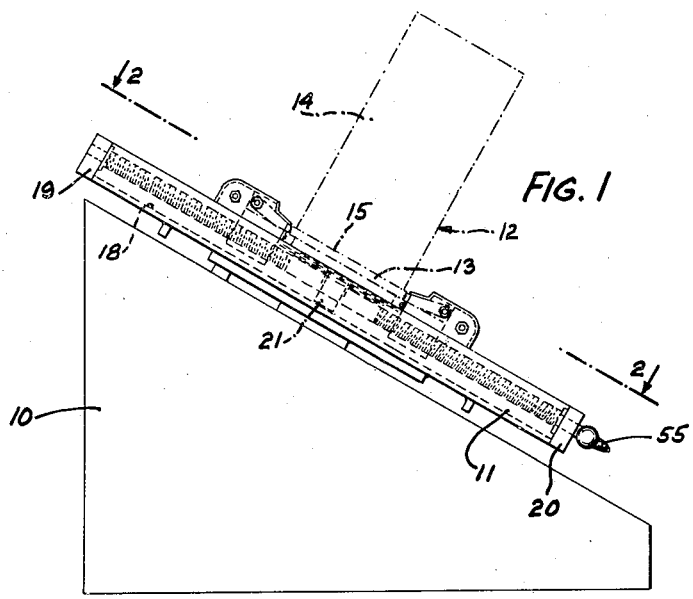
Figure 2:
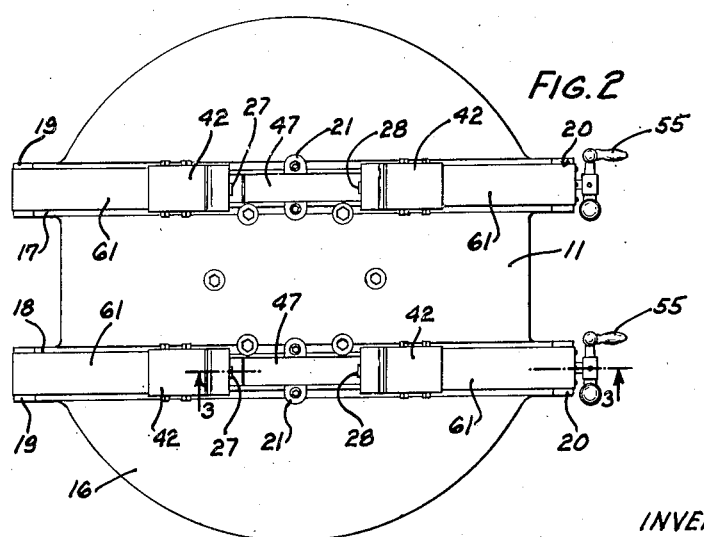
Fig. 2 is a plan view looking down at the top of the turntable along the line 2—2 in the direction of the arrows.

Referring to the drawings, wherein like reference characters designate the same parts throughout the several views, a turn table support 10 is shown (Fig. 1) which is adapted to rotatably support a turn table 11. The table 11 is adapted to support an article to be welded. In the specific embodiment shown, the article selected as an example is a loading coil case 12 to which a base 13 is to be welded. The details of construction of the support 10 and turn table 11 will not be described in detail herein since the present invention relates primarily to a clamping device for holding the loading coil case 12 on the turn table.

The practice in manufacturing loading coil cases has been to tack weld the sides 14 thereof to the base 13 in order to hold the two parts together during the final welding thereof, wherein they are fillet welded together along the line 15 to hermetically seal the bottom 13 to the sides 14. After a loading coil case 12 has had the sides 14 thereof tack or spot welded to the base 13, the case 12 may be positioned upon the turn table 11 and the clamping apparatus, to be described, adjusted to hold the case 12 on the turn table while the turn table is rotated during the fillet welding of the case along the line 15. The table 11 is formed of a flat upper portion 16 having formed integrally with it two depending channels 17 and 18 in which the clamping apparatus for clamping the case 12 to the table are mounted.

Since the two sets of clamping devices are identical in construction, only the one positioned in the channel 18 will be described in detail. Mounted at the ends of the channel 18 are a pair of bearing plates 19 and 20, which cooperate with a bearing block 21 to support a screw 22. The screw 22 has oppositely threaded portions 23 and 24, which threadedly engage clamping blocks 25 and 26, respectively, on which, in turn, clamps 27 and 28, respectively, are mounted. The clamps 27 and 28 are of exactly the same construction and are mounted in exactly the same manner in their respective clamping blocks and in order to conserve space, only the clamp 28 and its associated parts have been completely shown.

It will be noted that the clamp 28 is pivoted at 40 in a slot 41 formed in the upper portion of the clamping block 26. A housing 42 is fixed to the block 26 to enclose a portion of the clamp 28. Mounted on the underside of the upper portion of the housing 42 is a leaf spring 43, which normally tends to move the clamp 28 downwardly into engagement with the bottom 44 of the slot 41 in the clamping block. This spring 43 is protected against weld splatter by a cover plate 45 fixed to the clamp 28 and movable with it to cooperate with the top portion of the housing 42 in covering the clamp 28 adjacent its pivotal mounting and to cover the spring 43. Fixed to the left end of the clamping block 26, by means of a screw 46, is a cover plate 47, which has its left end turned upwardly slightly, as shown at 48, and slidably engaging a cover plate 49 fixed to the clamping block 25 by means of the screw 50. The right end (Fig. 3) of the cover plate 49 is beveled, as shown at 51, to facilitate the sliding of the plates 47 and 49 relative one to another. Fixed to the bearing 21 are a pair of oppositely disposed cover plates 53 and 54, which have their left and right ends (Fig. 3) turned downwardly slightly to cooperate with the plates 47 and 49, whereby the plates 47 and 49 are supported slidably upon the plates 53 and 54, it being understood that the plate 47, in the position shown, will rest on the plate 49 and the plate 49 will rest upon the plates 53 and 54. However, if the clamping blocks 25 and 26 are moved to their extreme outward positions, the plate 49 will just engage the left end of the plate 53 and the plate 47 may drop down onto the right end of the plate 54.

It is believed to be apparent, from the foregoing, that if the screw 22 is rotated, by means of the hand lever 55 pinned to the extending end of the screw at 56, to move the clamping blocks 25 and 26 away from each other, the portion of the screw thread between the clamping blocks will be covered by the cooperating cover plates 47, 49, 53 and 54.

Fixed in the housing 42 is a rod 60, to which there is, in turn, attached one end of a metal screen 61, the other end of which is attached to the bearing 20 at 62. The screen 61 is coiled to form a spring similar to a clock spring, which, when the clamping blocks 25 and 26 are in the position shown, will be coiled tightly under tension and which tends to uncoil so that as the blocks 25 and 26 are moved away from each other, the screen 61 will assume a more open spiral form and draw progressively more of the screen into the housing 42. When the clamping blocks 25 and 26 move along the screw 22, the depending sides of each housing 42 will move in a pair of grooves 65 and 66 formed in the upper surface of the turn table 11.

When it is desired to mount a partially welded loading coil case 14 on the turn table 11, to seam weld the bottom 13 to the sides 14, the case may be placed with the projecting portion of the bottom 13 on the top of the table between the clamps 27 and 28 and the hand levers 55 may be turned to force the clamps 27 and 28 into clamping engagement with the bottom 13 of the loading coil case 12. It will be noted that the clamps 27 and 28 are pivoted on their associated pivots 40 so that they are offset with respect to the center of the work and as more pressure is applied to the clamps through their clamping blocks 25 and 26 and the screw 22, the clamps will tend to move more tightly into engagement with the bottom 44 of the slot 41 formed in the clamping blocks, thereby to securely fix the loading coil case 12 on the turn table 11 and regardless of the size of the loading coil case 12, so long as it is within the capacity of the clamps to support it, the threaded portions 23 and 24 of the screw 22 will always be covered either by the screen 61 or by the plates 47, 49, 53 and 34, thereby preventing any weld splatter from damaging the threads.

Although a specific embodiment of the invention has been described hereinbefore, it will be understood that some modifications thereof may be made without departing from the scope of the invention, which is to be limited only by the appended claim.

What is claimed is:

A clamping device for welding apparatus comprising pairs of oppositely disposed clamping members, supporting elements for supporting said clamping members, a screw having oppositely threaded portions threadedly engaging opposite supporting elements for simultaneously moving the elements and members supported thereby toward and away from each other, a plurality of bearings for said screw, cover plates fixed to one of said bearings, cover plates fixed to said supporting members and cooperating with previously mentioned cover plates to cover the portion of the screw between the supporting members, a pin fixed to each supporting element, and a flexible metallic member having one end fixed to said pin and being coiled thereabout and having its other end fixed to one of said bearings, said flexible metallic member being constrained to uncoil itself whereby a portion of it will lie over the extremity of its associated screw to protect the threads of the screw.

GEORGE STUHLFAUTH.
KEITH A. WESTON.